June 24, 1924.

H. B. HARTMAN 1,498,839

MIXING UNIT FOR LIQUID PURIFICATION APPARATUS

Filed May 17, 1920   3 Sheets-Sheet 1

INVENTOR
H. B. Hartman,

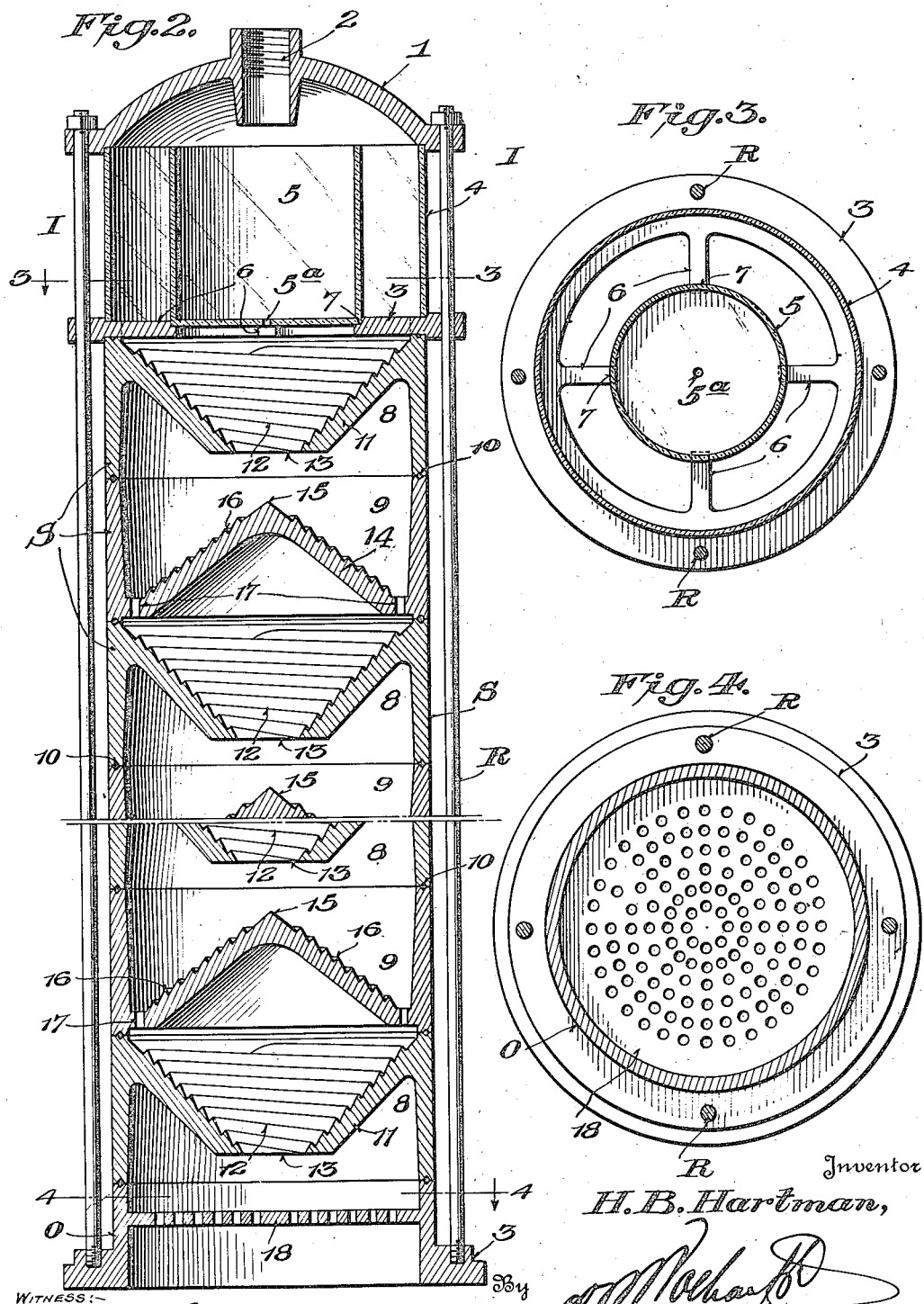

June 24, 1924.
H. B. HARTMAN
MIXING UNIT FOR LIQUID PURIFICATION APPARATUS
Filed May 17, 1920
1,498,839
3 Sheets-Sheet 3
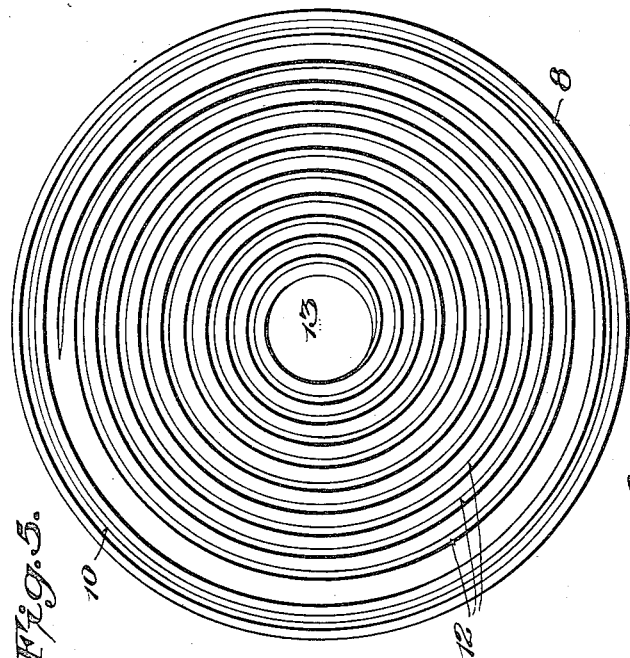
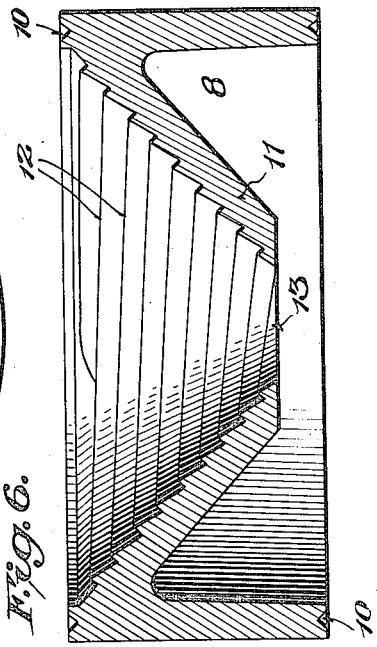
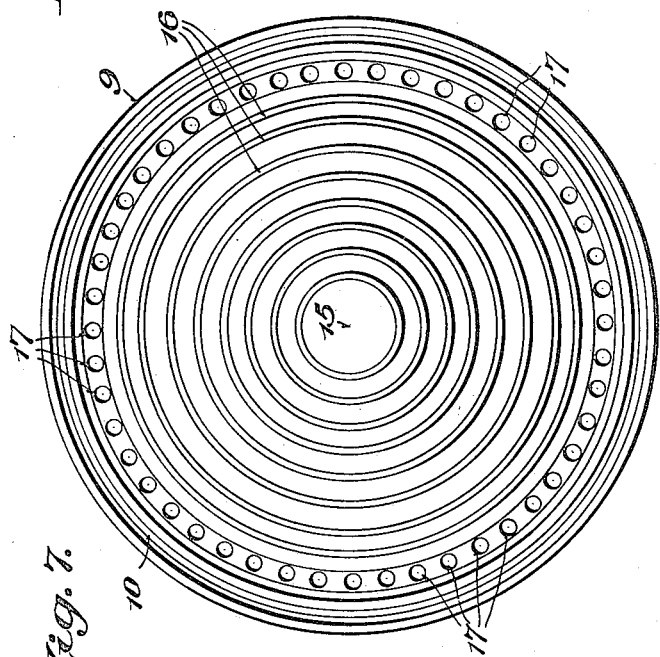
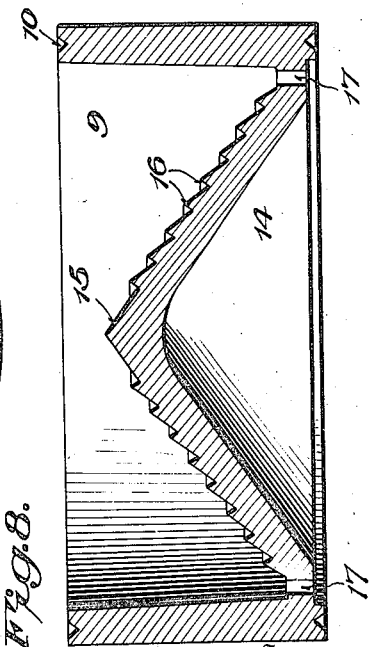

Patented June 24, 1924.

1,498,839

UNITED STATES PATENT OFFICE.

HARRY BUXTON HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

MIXING UNIT FOR LIQUID-PURIFICATION APPARATUS.

Application filed May 17, 1920. Serial No. 382,105.

*To all whom it may concern:*

Be it known that I, HARRY B. HARTMAN, citizen of the United States, residing at Scottdale, in the county of Westmoreland and State of Pennsylvania, have invented certain new and useful Improvements in Mixing Units for Liquid-Purification Apparatus, of which the following is a specification.

This invention relates to the general subject of liquid treatment, and has special reference to an improved mixing device for bringing a gaseous purifying agent such as ozone into intimate contact with raw water or other liquids to be treated.

A primary object of the invention is to provide a mixing device which will produce a maximum agitation of the liquid in the presence of a gaseous purifying agent such as ozone when purifying water. In carrying this object into effect it is proposed to provide a unit which may be built up to any desired capacity and also readily used in multiples or batteries to construct a machine for handling the required number of gallons per unit of time according to the demands of the installation.

A further object of the invention is to provide a unit which consists of a plurality of complemental sections which may be arranged in stacked relation to provide a cylindrical casing through which the water or other liquid may flow by gravity over a tortuous path and through pockets and over riffles, which serve to trap or hold the ozone gas which collects therein because of its relatively high specific gravity.

A still further and important object of the invention is to provide novel sections which have specially designed riffle surfaces and are arranged in such a manner that the liquid or water will pass from one section to the next with a whirling movement which creates a vortex that produces a partial vacuum at spaced intervals throughout the unit and hence creates a uniform suction which has the effect of accelerating the passage of the fluids through the unit. This is an important and practical feature of the invention for the reason that the force of the fluids passing from the injector is materially broken as they encounter the baffling effect of the stacked units, and they are likely to gravitate in a more or less quiescent state, especially in units of considerable height, but the creation of the suction by the liquid vortex serves to produce a uniform pulling effect on the gas and liquid throughout the unit, and keeps both in a thoroughly agitated state.

With the above and other objects in view which will more readily appear as the nature of the invention is better understood the same consists in the novel construction, combination and arrangement of parts hereinafter more fully described, illustrated and claimed.

A preferred and practical embodiment of the invention is shown in the accompanying drawings in which:—

Figure 2 is an enlarged vertical sectional view of the improved mixing unit.

Figure 3 is a horizontal sectional view on the line 3—3 of Figure 2.

Figure 4 is a horizontal sectional view taken on the line 4—4 of Figure 2.

Figure 5 is a top plan view of the vortex forming mixer section.

Figure 6 is a vertical sectional view of the part shown in Figure 5.

Figure 7 is a top plan view of the discharge mixer section.

Figure 8 is a cross section of the part shown in Figure 7.

Similar reference numerals designate corresponding parts throughout the several figures of the drawings.

Figure 1:
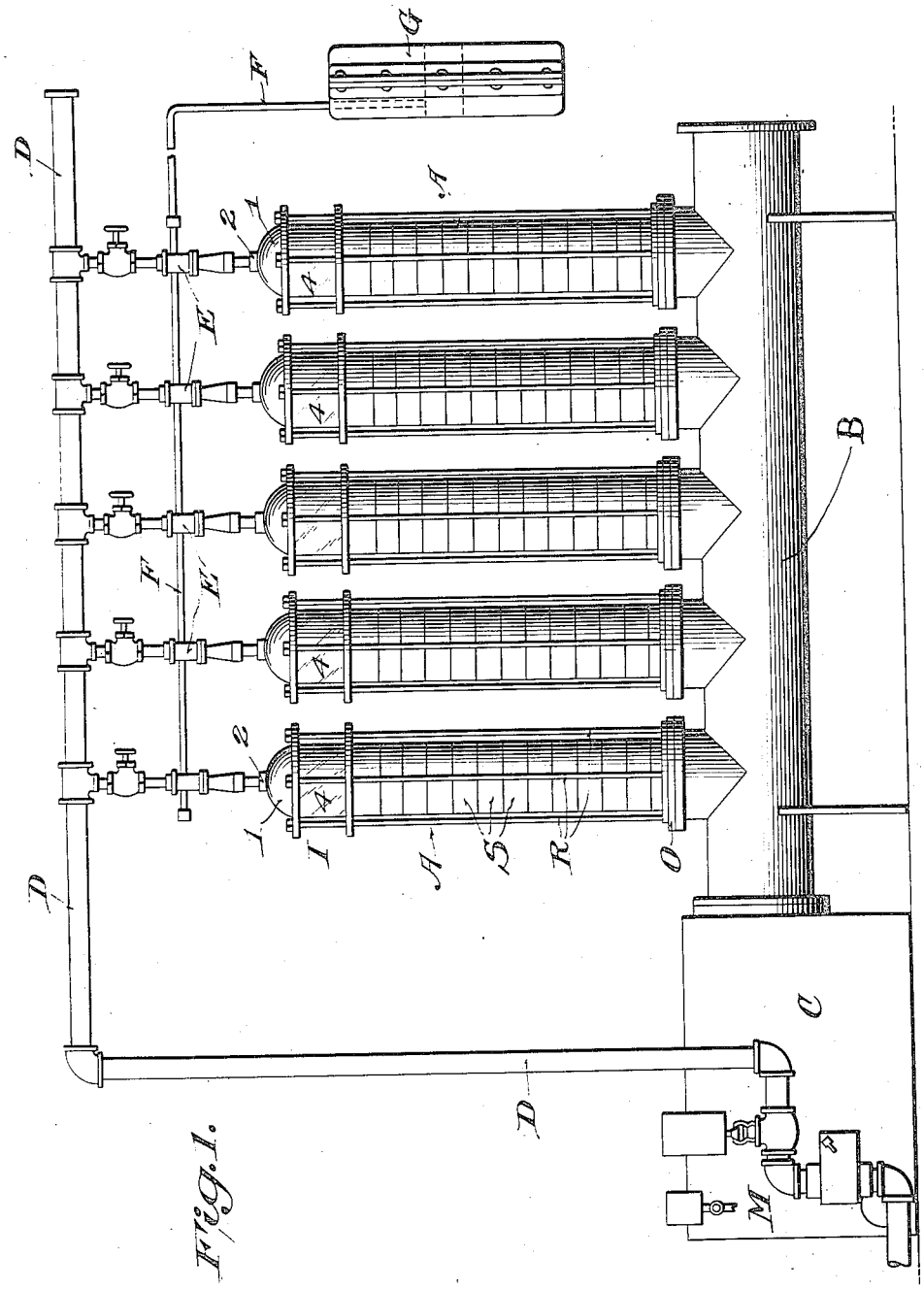
Figure 1 is a view of a multiple unit apparatus illustrating the arrangement and application of the individual mixing units.

As previously indicated one of the distinctive features of the invention is the provision of a novel mixing unit A consisting of a plurality of stacked sections capable of being arranged in pairs or couples, and of such construction and arrangement as to alternately concentrate and disperse or scatter the liquid over inclined cascading surfaces in such a manner that all the liquid is thoroughly agitated in the presence of the gaseous agent.

As shown in Figure 1 of the drawings it is proposed to use the said units A in any desired multiple to provide the required purifying capacity. For example, if in a water purifying plant each individual unit is designed for a purifying capacity of 1000 gallons of water per hour, the arrangement shown in the figure referred to illustrates an apparatus capable of purifying 5000 gallons per hour. Obviously, the arrangement shown may be modified to any desired extent to increase capacity, and as each individual unit is structurally identical a description of one will suffice for all.

And, in order to facilitate the understanding of the proper functioning and utility of the units it is pointed out that the same are preferably arranged to discharge into a common receiving pipe B leading to a storage reservoir C, for holding the purified water or other liquid and having means for controlling a suitable valve mechanism designated generally as M for regulating the flow of raw water through the pipe line D to the injector device E at the top of each unit. The general arrangement of parts shown, including the valve mechanism M is the subject of my co-pending application Serial No. 353,857, filed January 24, 1920, and in the present case, as in the application referred to, the level of purified water controls the supply of raw water, and also controls the electrical generation of ozone in an ozone generator G. Also, the ozone therein generated is conveyed to the present mixing devices A, by the injectors E connected with the ozone supply pipe F leading from the said ozone generator G.

Having now described the manner in which the liquid such as raw water and gas such as ozone are fed to the units, the novel structural features and characteristics of each mixing unit A will be referred to. It will be observed that the same is of cylindrical or tubular formation and arranged to receive the liquid and gas at one end and discharge the purified liquid at the other. Accordingly, it will be apparent that the individual sections which constitute the unit provide in effect a wall or casing when in stacked relation which affords a continuous passage-way through the unit.

From Figures 1 and 2 of the drawings it will be seen that each unit includes an inlet member designated generally as I and an outlet member O connected by suitable tie rods R for holding the individual casing forming and mixer sections S therebetween.

Referring particularly to the inlet member I it will be observed that the same includes a cap 1 having a nozzle portion 2 in communication with the injector E which supplies both the ozone and water. Beneath the said cap 1 is located a spider plate 3 for supporting a glass or other suitable ring 4 which forms a tubular wall for the inlet member, and constitutes an inspection tower surmounting the stacked mixer sections 5. The said spider plate 3 also supports a glass cup or receiving well 5 upon the relatively radially disposed arms 6 which are rabbetted as at 7 to form a seat for the bottom of the cup to prevent its displacement under the pressure of fluids issuing from the nozzle 2. The said cup 5 which forms the receiving well above referred to is preferably provided with a bleed hole $5^a$ in the bottom thereof, the said hole being of relatively small diameter and permitting the emptying of the well when the apparatus of which the unit is a part is at rest due to the purified storage reservoir C being filled to capacity with pure water.

This receiving well constitutes an important and practical feature of the unit since it provides for receiving the raw water and ozone discharged under pressure from the injector E and not only gives the gas and liquid a thorough preliminary mixing but at the same time constitutes a check against raw water passing into the unit without being treated or mixed with the ozone. For instance when the apparatus of which the unit is a part is automatically set in operation after a period of rest, the raw water first passes through the injector and the ozone follows and the well holds the raw water while the ozone is being drawn into use. Since the cup must be filled to capacity before any appreciable amount of water will escape the ozone will have had ample time to be drawn into action by the injector and the small amount of raw water is thus insured intimate contact with the purifying gas. Accordingly, the well operates as an effective check against raw water passing into the unit without carrying with it the proper supply of ozone. The amount of raw water passing from the nozzle before the ozone also starts to flow is so negligible that it is hardly necessary to consider this factor in the operation of the apparatus. Nevertheless the well provided by the cup 5 effectively provides for checking the initial inrush of water to a sufficient degree to off-set any undesirable results in this connection.

Referring particularly to the individual sections S it is to be observed that the same may be arranged in pairs or couples, or in other words one section is preferably a complement of an immediate adjacent section to assist in the action of concentrating and dispersing the liquid and gas over a maximum area of agitating surface. The first or top section of each couple is designated as 8 while the lower or discharge section is designated as 9, and it will be observed from Figures 1 and 2 of the drawings that the said complemental sections are of uniform diameter and cross-section whereby they may be assembled in stacked relation to cause the gasket channels 10 to register and form a closed ring.

In connection with the channels 10 above referred to it is to be noted that it is impossible to utilize a rubber or metallic gasket since the action of the gas ozone thereon would have a rapidily deteriorating and disintegrating effect. Therefore, it is proposed to provide a cementitious or vitreous gasket preferably applied to the edge of the unit in a plastic state by means of a suitable expelling tool which deposits the material in the channel of the lower section in the form of a ribbon. After the ribbon of sealing material has been placed on the edge of the section and fills in the groove or channel the upper section may be placed thereon in such a manner that it may be clamped in position thus pressing or forcing the plastic cementing material into all of the voids or depressions in the edges of the sections to take up or fill in any inequality of fit between the units in an effective manner. Accordingly, it will be apparent that the forming of the V-shaped groove or channel on both sides of the porcelain member whereby a plastic gasket may be used is important from the standpoint of providing a seal which cannot be attacked by the gas or liquids passing through the unit, and also obviates the necessity of grinding or machining the edges of the sections to a perfect alinement or fit.

The upper section 8 of the top couple or pair is arranged in receiving relation with reference to the inlet member I, and is formed with an interior baffle wall 11 which is preferably arranged at an angle of approximately 45° and provided on its upper surface with a continuous spiral rib 12 while the central portion thereof is cut away to provide an opening or outlet 13. The said baffle wall 11 is therefore in the form of an inverted and truncated cone, the line of truncation being above the plane of the lower edge of the outer wall of the section to provide increased clearance between the leaving or discharge edge of the wall and the receiving baffle wall 14 of the discharge unit 9 therebeneath.

The said baffle wall 14 of the discharge section 9 is of generally conical formation, with the angle of the pitch of the cone being less than the angle of the baffle wall 11, for instance approximately 36°, and the apex 15 thereof being also located below the line of the upper edge of the outer wall of the section to further augment the clearance between the baffle walls of the paired sections. This clearance is of material importance since the water and gases in passing from the baffle wall 11 of the upper section through the opening 13 form a vortex (due to being guided by the spiral rib 12) which has the effect of creating a suction in the space formed between the baffle walls which not only assists the operation of the injector but serves to maintain a uniform pull on the ozone and water throughout the entire unit. It will therefore be apparent that the water in passing from the baffle wall 11 of the upper section will be discharged onto the baffle wall 14 of the lower section with a whirling action which has the effect of creating the suction referred to.

The said baffle wall 14 of the lower section 9 is provided with a series of concentric cascading riffles 16 and the rim of the wall is provided with a plurality of discharge openings 17 which permit the fluids to escape in relatively small streams into the valley of the uppermost riffle on the receiving section of the next succeeding couple. The action of the water and gas above described is repeated in each and every couple or pairs of sections of the unit until the lowermost section is reached, whereupon the water and liquid is discharged onto the shower plate 18 of the outlet member O which still further breaks up the water into streams as it makes its exit from the unit into the common receiving pipe B.

From the foregoing it will be apparent that the distinctive feature of the present unit is the novel arrangement of the baffle plates of the complemental sections, which not only serve to cause the water to flow over a maximum riffling surface to produce a cascade effect to thoroughly and intimately bring the ozone into contact with the raw water, but at the same time the passage of water through alternate sections has the effect of producing a vortex at spaced intervals for creating a suction throughout the entire unit. The creation of the vortex or whirl-pool as above referred to is due to the formation of the spiral rib on the inclined baffle wall 11, and while the sections constructed to provide this effect are shown to be alternately arranged, it will of course be understood that any other arrangement of the vortex forming units will be resorted to as may be found desirable or expedient. Furthermore, the relative pitch of the baffle walls 11 and 14 of the sections 8 and 9 is of special importance since the flattening out of the angle of the cascade member lowers the apex to a point where augmented clearance is provided therebetween and the truncated end of the baffle wall 11 of the upper section.

A further novel and distinctive feature of the invention is the arrangement of the individual units in groups or batteries upon a common conduit which not only supports the same but enables the units to be used in multiples with great facility in combination with an accumulating reservoir or storage tank for the purified water. An example of this feature is shown in Figure 1 of the drawings and obviously its embodiment in other forms to meet enlarged capacities may be readily accomplished.

Without further description it is thought that the many features and advantages of the invention will be readily apparent and it will of course be understood that changes in the form, proportion and minor details of construction may be resorted to without departing from the spirit of the invention or scope of the appended claims.

I claim:

1. A mixing unit for liquid purifying apparatus including a plurality of paired sections the upper one of which is provided with a truncated baffle wall inclining toward the axis thereof and the lower section provided with a conical baffle wall having its apex arranged in spaced relation to the truncated end of the baffle wall of the upper section to provide a vortex forming space, and the said baffle wall of the lower member inclining toward the peripheral wall of the lower section.

2. A mixing unit for liquid purifying apparatus including a plurality of paired sections, a baffle wall in the upper end of one of each pair of said sections and having a discharge opening at its lower end disposed above the plane of the bottom of the section, and a substantially conical baffle wall in the other section of each pair having its apex located in a plane below the upper edge of the section, and below said discharge opening thereby providing a vortex forming space between the sections.

3. A mixing unit for liquid purifying apparatus including a plurality of mixer sections arranged in stacked relation to provide a tubular body for the unit, an inlet member arranged at the head of the stack and including a spider plate, a cup constituting a well supported on said spider plate, and a nozzle discharging into said well.

4. A mixing unit for liquid purifying apparatus including a plurality of mixing sections arranged in stacked relation to provide a tubular body for the unit, an inlet member arranged at the head of the stack and including a spider plate, a cup constituting a well supported on said spider plate, an annular wall forming ring also supported on the spider plate, and a cap having a centrally located nozzle arranged to discharge into the well formed by the cup.

5. A mixing unit for water purifying apparatus including a plurality of sections arranged in stacked relation and certain of which have truncated conical baffle walls, a base member arranged at the bottom of the stack and including an interior perforated partition arranged beneath a section having a truncated conical baffle wall.

6. A mixing unit for water purifying apparatus including a plurality of registering sections providing a tubular casing, reversely formed conical walls carried by adjacent sections, the wall of one section having a central opening and the wall of the other section having peripheral openings.

7. A mixing unit for water purifying apparatus including a plurality of registering sections providing a tubular casing, reversely formed conical walls carried by adjacent sections, the wall of one section having a central opening and the wall of the other section having peripheral openings, and a spiral rib formed on one of said conical walls for producing a liquid vortex discharging onto the other conical wall.

8. A water purifying apparatus including a tubular casing, a receiving section therefor, a receiving well therein and having a bleed hole, and an inlet member discharging into said well.

9. A water purifying apparatus including in combination, a support, a plurality of mixing units each having a transparent inspection section arranged on said support, and means for discharging water and ozone through said mixing units including the transparent inspection section.

10. A water purifying apparatus including in combination, a support, a plurality of tubular mixing units mounted on said support and an inspection tower at the top of each unit, a raw water supply line located above and common to all of said units, pipe connections between said raw water supply line and the towers of said mixing units, and an ozone supply conduit communicating with said pipe connections between the raw water supply line and the mixing units.

In testimony whereof I hereunto affix my signature in the presence of two witnesses.

HARRY BUXTON HARTMAN.

Witnesses:
MABEL FREEMAN,
GLADYS HAY.